United States Patent [19]

Bathe

[11] Patent Number: 5,008,366

[45] Date of Patent: Apr. 16, 1991

[54] PROCESS FOR PRODUCING ADHESIVES FROM POLYETHYLENE TEREPHTHALATE

[75] Inventor: Oscar M. Bathe, Woodridge, Ill.

[73] Assignee: Amoco Corporation, Chicago, Ill.

[21] Appl. No.: 514,428

[22] Filed: Apr. 25, 1990

[51] Int. Cl.⁵ .............................................. C08G 63/46
[52] U.S. Cl. .................................... 528/272; 528/274; 528/275; 528/278; 528/280; 528/281; 528/282; 528/283; 528/285; 528/296; 528/300; 528/302; 528/308.1; 525/437; 521/48; 521/48.5
[58] Field of Search ............... 528/272, 274, 275, 278, 528/280, 281, 282, 283, 285, 296, 300, 302, 308.1; 529/437; 521/48, 48.5

[56] References Cited

U.S. PATENT DOCUMENTS 3,951,886 4/1976 Miyake et al. ...................... 521/48.5

Primary Examiner—John Kight, III
Assistant Examiner—Sam A. Acquah
Attorney, Agent, or Firm—Gunar J. Blumberg; William H. Magidson; Ralph C. Medhurst

[57] ABSTRACT

A process is disclosed for preparing adhesives from polyethylene terephthalate which comprises reacting a trimellitic acid polyester ether with polyethylene terephthalate to prepare a nonlinear copolymer with crosslinking characteristics suitable for use as an adhesive either as a hot-melt adhesive or as a pressure-sensitive adhesive.

10 Claims, No Drawings

PROCESS FOR PRODUCING ADHESIVES FROM POLYETHYLENE TEREPHTHALATE

FIELD OF THE INVENTION

The field of this invention relates to adhesives prepared from recovered polyester from waste material and is particularly concerned with the preparation of hot-melt and pressure-sensitive adhesives wherein a trimellitic acid polyester ether of at least 500 molecular weight is reacted with polyethylene terephthalate to prepare copolymers of trimellitic acid polyester ether and polyethylene terephthalate of a molecular weight within the range of from about 1000 to about 1200. These polymers are solids and are useful as hot-melt adhesives and pressure-sensitive adhesives.

BACKGROUND OF THE INVENTION

This invention relates to recovery of polyester from waste materials, to the preparation of adhesive materials from the recovered polyester and, in particular, to hot-melt adhesives of exceptionally high tack characteristics. Commercially available hot-melt adhesives can be used in packaging, bookbinding, and disposable soft goods markets such as backing, labels and decalcomania. Additional application areas include laminates, seaming tapes and related applications.

Polyesters, typically polyethylene terephthalate, are enjoying an increasing demand in the manufacture of not only fibers and films but also of containers for food and drink and of food packaging films owing to their favorable mechanical properties, transparency, heat resistance, electrical characteristics, and the like. Since such polyester containers and films, to a certain extent, function as gas barriers, their use is favorable for the preservation of food and drink, as well as other materials requiring such barriers. However, the properties of polyesters, which cause their widespread use, also result in the creation of vast quantities of polyester waste. The waste is generated as a by-product of the manufacturing process, i.e., as by-products from extrusion and forming of the polyester resin into finished articles and from the disposal of the used articles. Polyethylene terephthalate polymers are accordingly widely available as scrap photographic film and synthetic fibers, as sludges obtained as clean-up by-products from manufacturing plants, and as contaminated scrap from polyethylene terephthalate waste recovery sources such as bottle reclaiming plants.

For economically using the polyester wastes, there have been known methods, such as (1) utilizing the polyester wastes as they are for some purposes, (2) depolymerizing the polyester wastes to give starting materials useful for production of new polyesters, and (3) reacting the polyester wastes with polyols or polycarboxylic acids to give new polyesters.

Depolymerizing waste polyethylene terephthalate polyester by glycolysis of the polyester with excess ethylene glycol in the presence of water is taught in U.S. Pat. No. 4,078,143. Recovery of polyester waste with excess ethylene glycol at elevated temperatures by glycolysis of the polyester forms bis(2-hydroxyethyl) terephthalate and low molecular weight polymers thereof. Formation of glycol ethers, principally diethylene glycol, which copolymerize with the bis(2-hydroxyethyl) terephthalate, is a disadvantage of this method. Formation of the diethylene glycol can be inhibited by use of lithium acetate dihydrate in combination with zinc acetate dihydrate and/or antimony trioxide, as taught in U.S. Pat. No. 3,830,739. However, the results obtained in both U.S. Pat. No. 4,078,143 and 3,830,739 indicate the presence of diethylene glycol in the recovered polymers.

Other known digestion processes include treatment with low molecular weight polyols selected from the class consisting of diols and triols (U.S. Pat. No. 4,048,104); treatment with caustic monohydric alcohol (U.S. Pat. No. 3,728,287); treatment with monohydric alcohol and ester interchange catalyst (U.S. Pat. No. 3,488,298); heating with glycols and vinyl acetate (U.S. Pat. No. 3,857,799); heating with bis ester solvents (U.S. Pat. No. 3,884,850); and dissolving in ethylene glycol and/or terephthalic acid and/or dimethyl terephthalate (U.S. Pat. No. 3,907,868; 3,701,741; 3,703,488; 3,776,945; 3,257,335). The polyesters are taught as digested for reuse in the process of making additional polymers of molecular weights in excess of 15,000, that is, the digestion products are reintroduced into the process from which they originated or into other processes as a polyol ingredient to prepare other polymers.

Reacting the polyester wastes with polyols and/or polycarboxylic acids in the presence of a titanium catalyst to produce an oligomer and then polycondensing the resulting depolycondensation product with at least one polycarboxylic acid or an anhydride thereof and at least one polyol is taught in U.S. Pat. No. 3,951,886.

As noted hereinabove, the several methods for recovering scrap polyethylene terephthalate polyester to obtain new polyesters can result in the production of undesirable by-products, such as diethylene glycol, which contaminate the final product or require further purification before preparation of the new polyesters. Such processes can be costly and represent a significant increase in the cost of recovering scrap polyethylene terephthalate, even to the extent of causing the recovery process to be uneconomical in view of the comparable cost of producing virgin polyethylene terephthalic resin.

Accordingly, it is an object of this invention to provide a low-cost process for the recovery of polyethylene terephthalate waste wherein the product resulting therefrom is directly useful without further purification to remove undesirable by-products before preparation of new polyesters.

It is further an object of this invention to provide a process for the preparation of hot-melt and pressure-sensitive adhesives from polyethylene terephthalate waste which adhesives have superior properties as compared with currently available hot-melt adhesives and pressure-sensitive adhesives.

A further object of this invention is to provide a unique method for digesting polyester waste of polyethylene terephthalate which minimizes the production of by-products such as ethylene glycol and diethylene glycol.

SUMMARY OF THE INVENTION

A process is disclosed for digestion of polyester waste comprising polyethylene terephthalate and for the preparation of high performance hot-melt adhesives or pressure-sensitive adhesives thereby. The resulting hot-melt adhesives have low softening points and demonstrate excellent adhesion to substrates. The pressure sensitive adhesives demonstrate good adhesion to kraft paper and aluminum foil.

DETAILS OF THE INVENTION

In general, it has been discovered that a polyester polymer comprising the reaction product of a tribasic polyester ether and polyester waste comprising polyethylene terephthalate can be prepared wherein the resulting polyester ether polymer has high performance adhesive properties. The novel aromatic polyester ether polyols are made by using recycled polyethylene terephthalate (PET). This may be any scrap residue from waste polyethylene terephthalate which contains compounds which have the moiety

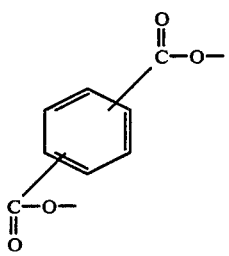

Generally, the scrap or recycled polyethylene terephthalate may be in any particulate form. A frequently seen form is fragmentized soft drink bottles which appear as clear or colored chips. Polyethylene terephthalate film can also be recycled. Any chopping or pulverizing process which produces small bits of solid PET from the larger, waste recycle article would be appropriate to produce scrap PET useful herein. Sometimes the scrap PET is mixed with a solvent to make a kind of slurry. While scrap PET slurry can be used in the method of this invention, the recycled PET chips without the solvent are also useful.

The amount of trimellitic acid polyester ether should be sufficient to digest all of the waste polyester to prepare the polyester polymer. Mole ratio of trimellitic acid polyester ether to polyethylene terephthalate is in the range of from about 1:1 to about 1:3. The resulting copolymer is a nonlinear polymer with cross-linking characteristics and has a melting point within the range of from about 125° F. to about 185° F. The reaction will proceed rapidly at an elevated temperature at atmospheric pressure, although an elevated pressure can be used.

In the process of this invention, a trimellitic acid polyester ether of at least 500 molecular weight and less than about 2000 molecular weight is reacted with polyester waste comprising polyethylene terephthalate to digest the polyethylene terephthlate and prepare in situ a polyester polymer of molecular weight within the range of from about 1000 to about 3000.

The trimellitic acid polyester ether is prepared in situ by reacting trimellitic anhydride with a polyethylene glycol of molecular weight of from about 100 to about 650 in a mole ratio of 1:3 in the presence of an esterification catalyst. Acid number of the resulting trimellitic acid polyester ether is typically no greater than 10, preferably less than 5. A slight excess of polyethylene glycol over the mole ratio of 1:3, trimellitic anhydride to polyethylene glycol, to ensure complete reaction of the carboxyl groups on the trimellitic anhydride is typically used to ensure complete reaction of the carboxyl groups of the trimellitic anhydride. Use of a mole ratio less than 1:3 can result in an undesirable high acid number, over 10, from failure to completely react the aforesaid carboxyl groups. The trimellitic acid polyester ether, with a high acid number, when reacted with polyethylene terephthlate, results in a final copolymer of a lower molecular weight, with a broader molecular weight distribution. The resulting adhesive composition tends to have impaired adhesive properties as compared with an adhesive prepared from a trimellitic acid polyester ether of a low acid number.

The polyester polymer of trimellitic anyhydride and the polyethylene glycol is a nonlinear polymer and has a functionality of at least 3, which result in cross-linking characteristics with consequent unique properties in the hot-melt and pressure-sensitive adhesives prepared therefrom due to the sidechain configuration of the molecule.

The aromatic component of the polyester polymer can be either trimellitic anhydride or trimellitic acid, but trimellitic anhydride is preferred.

The esterification catalyst used to esterify the polyester polymer of trimellitic anhydride and polyethylene glycol can be any suitable esterification catalyst. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1,3,3,-tetramethylguanidine, N,N,N',N'-tetramethyl-1,3-butanediamine, N,N-dimethyethanolamine, N,N-diethylethanolamine, and the like. The catalysts generally comprise from 0.1 to 2.0, and preferably from 0.3 to 1.0, weight percent of the total composition.

A particularly suitable catalyst has been found to be hydrated monobutyltin oxide, FASCAT (TM) 4100, available from M&T Chemicals, Inc. Rahway, N.J.

The polyols of the digesting medium desirably are low molecular weight polyols which can be aliphatic, cycloaliphatic, aromatic, araliphatic and/or heterocyclic and are preferably selected from the group consisting of diols and triols. Alkoxylated triols can be employed. More preferably, the polyol is an aliphatic dihydric alcohol which desirably has from 2 to 16 carbon atoms. The molecular weight of the digesting polyol advantageously ranges from about 60 to about 500. Examples of suitable diols include alkylene glycols and glycol ethers, such as ethylene, oxydiethylene, propylene, oxydipropylene, butylene, pentylene, hexylene, octamethylene glycols, and isomeric forms thereof, and the polyoxyalkylene glycols such as polyoxyethylene and polyoxypropylene glycols, 1,4-bis-hydroxymethyl cyclohexane, dimethylol dicyclopentadiene, 1,3-cyclohexanediol, 1,4-cyclohexanediol, and in general hydroxy-terminated esters or mixed ether esters having a molecular weight of about 500 or less. The polyols may, of course, be used as mixtures of two or more polyols. The polyols may include substitutants which are inert in the digestion reaction, for example, chlorine and bromine substituents. Preferred polyols are polyoxyethylene glycols, diethylene glycol and dipropylene glycol, with the later two glycols being especially suitable.

More preferred polyols are Carbowax (TM) polyethylene glycols, i.e., Carbowax (TM) 200, 400 and 600. These polyols are oxyalkylene polymers of molecular weights of about 180–220, 380–420, and 580–620, respectively.

In the production of hot-melt adhesives, known additives may be employed to increase the suitability of the polyester for particular applications. For example, in a bookbinding application, additives such as waxes, resins, and rosins may be employed. Other applications may require the use of rosin esters and/or plasticizers for reasons of improved tack, adhesion and melt point.

Generally, the preparation of the trimellitic acid polyester ether is at a temperature within the range of from about 380° F. to about 460° F., and a catalyst is employed to drive the reaction to the desired low acid number in reasonable time. Preferably the temperature is in the range of from about 400° F. to about 440° F. The pressure can be atmospheric, sub-atmospheric or above atmospheric from greater than 1 to about 30 atmospheres.

The temperature of the reaction of the trimellitic acid polyester ether with the polyethylene terephthalate is within the range of from about 380° F. to about 500° F., preferably from about 450° F. to about 480° F. Pressure can be sub-atmospheric, atmospheric, or above atmospheric from greater than 1 to about 30 atmospheres.

In summary, the instant invention comprises a process for the preparation of adhesive compositions comprising the reaction product of a trimellitic acid polyester ether and a polyol of a molecular weight ranging from about 100 to about 650, and polyethylene terephthalate, which process comprises: (a) preparing a trimellitic acid polyester ether of at least 500 molecular weight and less than about 1500 molecular weight and an acid number of up to 10 by reacting trimellitic anhydride or trimellitic acid with a polyethylene glycol of molecular weight from about 100 to about 650 wherein mole ratio of said trimellitic anhydride or trimellitic acid to said polyethylene glycol is at least 1:3, in the presence of an esterification catalyst at a temperature within the range of from 380° F. to about 500° F., preferably from about 400° F. to about 440° F., at a pressure ranging from about 1 to about 30 atmospheres; (b) reacting in situ said trimellitic acid polyester ether with polyethylene terephthalate at a temperature within the range of from about 450° F. to about 480° F., a pressure from about 1 to about 30 atmospheres, wherein the mole ratio of said trimellitic acid polyester ether to said polyethylene terephthalate is in the range of from about 1:1 to about 1:3; to prepare a copolymer of trimellitic acid polyester ether and polyethylene terephthalate of a molecular weight within the range of about 1000 to about 1200, a functionality of at least 3, and an acid number of from about 3 to about 10; and (c) recovering said copolymers of trimellitic acid polyester ether and polyethylene terephthalate as a liquid at an elevated temperature or as a solid at ambient temperature.

The said esterification catalyst is selected from the group consisting of organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium. Preferably, the said esterification catalyst is hydrated monobutylin oxide. The said polyethylene terephthalate can be in a particulate form comprising chopped and/or fragmentized solid particles. The said polyethylene terephthalate can be in the form of a slurry prepared by adding said polyethylene terephthalate to a solvent. The copolymer of trimellitic acid polyester ether and polyethylene terephthalate prepared by the instant process typically is a nonlinear polymer with cross-linking characteristics and has a melting point within the range of from about 125° F. to about 185° F.

The resulting adhesive composition typically comprises a copolymer of trimellitic acid polyester ether of at least 500 molecular weight and less than 1500 molecular weight and polyethylene terephthalate, wherein said copolymer has a molecular weight within the range of from about 1000 to about 1200, is a nonlinear copolymer with cross-linking characteristics, has a melting point within the range of from about 125° F. to about 185° F. and is prepared by the process of the instant invention. The resulting adhesive composition can be a hot-melt adhesive or a pressure-sensitive adhesive.

the following examples are illustrative of the process of the instant invention and are not to be construed as limiting the scope of the invention.

EXAMPLE I

Four aromatic polyester polyols were prepared. The trimellitic acid polyester ethers were prepared using diethylene glycol, Carbowax (TM) 200, 400, and 600, products of Union Carbide Corporation, New York, N.Y. The mole ratios of the materials are shown in Table 1.

TABLE I

| Materials | Polyester No. 1 | Polyester No. 2 | Polyester No. 3 | Polyester No. 4 |
|---|---|---|---|---|
| | | Moles | | |
| Trimellitic Anhydride | 1.0 | 1.0 | 1.0 | 1.0 |
| Diethylene Glycol | 3.0 | | | |
| Polyethylene Glycol 200 | | 3.0 | | |
| Polyethylene Glycol 400 | | | 3.0 | |
| Polyethylene Glycol 600 | | | | 3.0 |

The polyester polyols were synthesized by the one-stage method at a maximum temperature of 450° F. (232° C.). Fascat (TM) 4100, an esterification catalyst, was employed to drive the reaction to the low acid number desired in a reasonable time. The reactants were charged to a four-liter glass reaction kettle equipped with mechanical agitation, a nitrogen sparge, a packed partial steam condenser, a cold water total condenser, and thermometers for monitoring both kettle and overhead temperature. When the overhead temperature fell to 194° F. (90° C.), the steam condenser was removed. A Barrett trap was immediately installed in the open kettle port and attached directly to the cold water total condenser. As the reaction neared completion, the nitrogen sparge rate was increased (as high as 2.5 cfm), and any significant glycol lost was added back to obtain the low acid number required. Once the reaction was completed, cooling of the resin was started. At 400° F. (204° C.), the nitrogen sparge was discontinued and a vacuum was applied which was continued while the resin cooled to remove any residual water.

After the resin cooled to 302° F. (150° C.), polyethylene terephthalate (PET), 576 grams of PET scrap, was charged into the reaction kettle. The mixture was then heated to 482° F. (250° C.) and held at that temperature for 4 hours. The digested scrap polymer was then cooled and analyzed for number average molecular weight using vapor pressure osmometry (VPO), hydroxyl number, and size distribution using gelpermeation chromatography (GPC). VPO results and hydroxyl number are listed in Table II.

TABLE II

|  | Number Average Molecular Weight | Hydroxyl Number |
|---|---|---|
| Polyester #1 | 508 (474)* |  |
| Polyester #1 & PET scrap | 1046 (1050)* | 141 (160)* |
| Polyester #2 | 746 (756)* |  |
| Polyester #2 and PET scrap | 1226 (1332)* | 102 (126)* |
| Polyester #3 | 998 (1356)* |  |
| Polyester #3 and PET scrap | 1536 (1932)* | 78 (87)* |
| Polyester #4 | 1401 (1956)* |  |
| Polyester #4 and PET scrap | 2076 (2532)* | 50 (66)* |
| PET scrap | 20,000 |  |

Note:
*Theoretical Value

Examination of the resulting polymers indicated that the mixtures of trimellitic acid polyester ether and the scrap polyethylene terephthalate had been digested and the resulting polymers were clear liquids and free of all PET scrap. Two of the resulting polymers were flowable, clear liquids at ambient (room) temperature, and two were clear solids at ambient temperature. The number average molecular weight of the digested polymers was close to the theoretical value. The hydroxyl numbers of the resulting polymers were slightly lower than the theoretical values.

EXAMPLE II

Samples of the polyesters prepared in Example I were tested as hot-melt adhesives and hot-melt pressure sensitive adhesives.

The polymer was drawn down at a 10 mil thickness on 60 pound kraft paper. Before testing the sample as a hot melt adhesive, each draw down was heat-sealed to another 60 pound kraft paper substrate, aluminum substrate, and a polyethylene substrate. A 180° peel adhesion test was then run on each specimen using the slip peel tester. The results shown in Table III demonstrate a very strong adhesive for packaging, bookbinding, and disposable soft goods applications. Generally, a 2-4 pound peel adhesion is adequate with or without substrate failure. The sample gave 3-7 pounds peel adhesion properties with substrate failure on paper and foil. (Substrate failure indicates that the adhesive is stronger than the substrate)

This polymer was also tested as a hot-melt, pressure sensitive adhesive. A 60 pound kraft paper, aluminum foil, and polyethylene substrate was laid on top of the 10 mil draw down. A 4.5 pound roller was drawn across and back on each substrate to apply pressure for bonding the substrates. The 180° peel adhesion test was then run as before to determine the adhesive qualities of the polymer. The results of this test showed good adhesion to kraft and foil but poor adhesion to the polyethylene substrate. The application area includes laminates, seaming tapes, and other related areas.

TABLE III

| Substrates | 180° Peel Adhesion |
|---|---|
| Hot Melt Adhesion Testing | |
| Kraft Paper to Kraft Paper | 6.6 lbs./in. width |
| Kraft Paper to Aluminum Foil | 6.9 lbs./in. width |
| Kraft Paper to Polyethylene Film | 3.6 lbs./in. width |
| Hot Melt Pressure Sensitive Adhesion Testing | |
| Kraft Paper to Kraft Paper | 3.0 lbs./in. width |
| Kraft Paper to Aluminum Foil | 6.9 lbs./in. width |
| Kraft Paper to Polyethylene Film | 0.8 lbs./in. width |

That which is claimed is:

1. A process for the preparation of high tack adhesive compositions, as hot melt adhesives for paper, aluminum and polyethylene substrates and as pressure-sensitive adhesives for paper and aluminum substrates, comprising the reaction product of a trimellitic acid polyester ether and a polyol of a molecular weight ranging from about 100 to about 650, and polyethylene terephthalate, which process comprises:
   (a) preparing a trimellitic acid polyester ether of at least 500 molecular weight and less than about 1500 molecular weight and an acid number of up to 10 by reacting trimellitic anhydride or trimellitic acid with a polyethylene glycol of molecular weight from about 100 to about 650, wherein mole ratio of said trimellitic anhydride or trimellitic acid to said polyethylene glycol is at least 1:3, in the presence of an esterification catalyst at a temperature within the range of from about 380° F. to about 500° F. at a pressure ranging from about 1 to about 30 atmospheres;
   (b) reacting in situ said trimellitic acid polyester ether with polyethylene terephthalate at a temperature within the range of from about 450° F. to about 480° F., a pressure from about 1 to about 30 atmospheres, wherein mole ratio of said trimellitic acid polyester ether to said polyethylene terephthalate is in the range of from about 1:1 to about 1:3, to prepare a copolymer of trimellitic acid polyester ether and polyethylene terephthalate of a molecular weight within the range of from about 1000 to about 1200, a functionality of at least 3, and an acid number of from about 3 to about 10; and
   (c) recovering said copolymers of trimellitic acid polyester ether and polyethylene terephthalate as a liquid at elevated temperature or as a solid at ambient temperature.

2. The process of claim 1 wherein said esterification catalyst is selected from the group consisting of organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium.

3. The process of claim 1 wherein said esterification catalyst is hydrated monobutylin oxide.

4. The process of claim 1 wherein said polyethylene terephthalate is in a particulate form comprising chopped and/or fragmentized solid particles.

5. The process of claim 1 wherein said polyethylene terephthalate is in the form of a slurry prepared by adding said polyethylene terephthalate to a solvent.

6. The process of claim 1 wherein said trimellitic anhydride or said trimellitic acid is reacted with said polyethylene glycol at a temperature within the range of from about 400° F. to about 440° F.

7. The copolymer of trimellitic acid polyester ether and polyethylene terephthalate prepared by the process of claim 1 wherein said copolymer is a nonlinear polymer with cross-linking characteristics and has a melting point within the range of from about 125° F. to about 185° F.

8. A high tack adhesive composition for hot melt and pressure-sensitive applications comprising a copolymer of trimellitic acid polyester ether of at least 500 molecular weight and less than 1500 molecular weight and polyethylene terephthalate wherein said copolymer has a molecular weight within the range of from about 1000 to about 1200, is a nonlinear copolymer with cross-linking characteristics, has a melting point within the range of from about 125° F. to about 185° F. and is prepared by the process of claim 1.

9. The adhesive composition of claim 8 wherein said adhesive composition is a hot-melt adhesive for paper, aluminum and polyethylene substrates.

10. The adhesive composition of claim 8 wherein said adhesive composition is a pressure-sensitive adhesive for paper and aluminum substrates.

* * * * *